United States Patent [19]

Mouché et al.

[11] Patent Number: 4,834,955
[45] Date of Patent: May 30, 1989

[54] CHEMICAL FORMULATION AND COMBINED PROCESS FOR INHIBITING DEPOSITION AND CORROSION IN COOLING WATER AND GYPSUM SCALING IN FLUE GAS DESULFURIZATION SCRUBBER SYSTEMS

[75] Inventors: R. J. Mouché, Batavia; M. L. Lin; E. W. Ekis, Jr., both of Naperville, all of Ill.

[73] Assignee: Nalco Chemical Company, Naperville, Ill.

[21] Appl. No.: 186,440

[22] Filed: Apr. 26, 1988

[51] Int. Cl.[4] .............................................. C01B 17/00
[52] U.S. Cl. ..................................... 423/242; 55/73; 55/89; 55/96; 261/DIG. 46; 261/17; 261/DIG. 11; 261/DIG. 9; 261/21; 252/180
[58] Field of Search ................. 252/180; 55/73, 84, 55/89, 90, 96; 261/DIG. 46, 17, DIG. 11, DIG. 9, 21; 423/242

[56] References Cited

U.S. PATENT DOCUMENTS

| | | | |
|---|---|---|---|
| 3,914,378 | 10/1975 | Selmeczi | 423/242 A |
| 4,250,152 | 2/1981 | Biedell et al. | 423/242 A |
| 4,406,811 | 9/1983 | Christensen et al. | 252/180 |
| 4,464,315 | 8/1984 | O'Leary | 261/DIG. 46 |
| 4,530,955 | 7/1985 | Wilson et al. | 252/180 |
| 4,670,224 | 6/1987 | Stehnins et al. | 423/242 |
| 4,713,195 | 12/1987 | Schneider | 252/180 |

OTHER PUBLICATIONS

Dubin, L., "The Effect of Organophosphorus Compounds and Polymers on CACO3 Crystal Morphology," J. Cooling Tower Institute, 3 (1), 17 (1982).
Bohnsack, G., Lee, K. H., Johnson, D. A., and Buss, E., "Investigations of the Mechanisms of Organic Compounds used in Cooling Water Corrosion Control," presented at Corrosion/Nace, Mar. 1985.
Schumacher, P. D., J. A. Romberger, and R. A. Johnson, "Corrosion Inhibition Techniques in Recirculating Cooling Water," Proceedings Int. Water Conf., 47, 360, 1986.
Kelly, J. A., Lin, M. L., and Johnson, D. A., "Computer Aided Modeling and Monitoring of Cooling Water and Boiler Water Chemistry," presented at Corrosion/Nace, Mar. 1986.
Hoots, J. E. and Crucil, G. A., "The Mechanism of Polymers in Alkaline Cooling Water Programs," presented at Corrosion/Nace, Mar. 1986, also Materials Performance, 26 (4), 17 (1987).
Lin, M. L., Ekis, E. W., Jr., Mouche', R. J., and Nassos, P. A., "Effective Gypsum Scale Inhibitors for Flue Gas Desulfurization Applications," presented at Corrosion/Nace 88, Mar. 21-25, 1988.

Primary Examiner—Bernard Nozick
Attorney, Agent, or Firm—Willian Brinks Olds Hofer Gilson & Lione Ltd.

[57] ABSTRACT

An inhibitor formulation for inhibiting corrosion and deposition of calcium phosphate, calcium carbonate, and silt in a cooling water system and calcium sulphate (gypsum) scaling in a flue gas desulfurization system. The inhibitor formulation comprises polyacrylate, polymaleic anhydride, and phosphonate in a active weight ratio range between about 1 to 40:1 to 40:0.1 to 15, respectively. The inhibitor formulation is employed to inhibit corrosion and scaling in a combined cooling water/flue gas desulfurization process wherein at least a portion of cooling water blowdown is supplied to make up at least a portion of reagent makeup and/or mist eliminator wash water in the flue gas desulfurization system.

8 Claims, 1 Drawing Sheet

CHEMICAL FORMULATION AND COMBINED PROCESS FOR INHIBITING DEPOSITION AND CORROSION IN COOLING WATER AND GYPSUM SCALING IN FLUE GAS DESULFURIZATION SCRUBBER SYSTEMS

BACKGROUND OF THE INVENTION

The present invention relates to a combined treatment process for inhibiting deposition and corrosion in a cooling water system and the formation of gypsum scale in a flue gas desulfurization (FGD) wet scrubber.

An open recirculating cooling water system consists of primarily a cooling tower and a heat exchanger. Heat from a process, such as the condensing of a steam, is transferred via the heat exchanger into a fluid medium which is usually water. This heated water is pumped to the top of a cooling tower and falls as droplets through a gaseous medium, usually air, to the basin below. Air is drawn up through the cooling tower which contacts the falling water droplets, and cools the water by sensible heat transfer and evaporation. The cooled water is returned to the heat exchanger, to pick up more heat from the process.

Because water is evaporated in the cooling tower and the fresh water entering the cooling water system contains impurities such as silt and dissolved mineral solids (dissolved metal ions such as calcium, magnesium, and iron, and anions such as carbonate, phosphate, silica, and sulfate), these impurities become concentrated in the recirculating cooling water. The calcium and other metal ions can come out of solution and from deposits on the heat exchangers in the form of a scale such as calcium carbonate. This happens because the ions become concentrated and exceed solution solubility in the cooling water. The silt can also stick to the surfaces of the heat exchanger. These deposits impede heat transfer across the heat exchanger negatively impacting the efficiency of the cooling process.

The concentration of the solution anions also effects corrosion. Specifically, high levels of chloride or sulfate ions increase the corrosion potential of the metal portions of the cooling system such as the heat exchanger, transfer lines and pumps. Corrosion is further accelerated by deposits such as mentioned above. Therefore, scale and corrosion inhibitors are added to the cooling system to control corrosion and scaling.

FGD wet scrubbers are designed to remove sulfur dioxide ($SO_2$) from flue gas by contacting the flue gas with reagent solution or slurry in an absorber. The absorber is typically of spray tower design, where the recirculating slurry droplets, usually from 2 to 4 levels of spray nozzles, contact the $SO_2$ countercurrently, and the clean, scrubbed flue gas goes off the stack, after passing a mist eliminator.

The function of the mist eliminator is to entrap mist particles in the gas stream upon impingement. Mist eliminators are usually made of plastic baffles, chevrons, or honeycombs. Deposit buildup on the mist eliminator increases flue gas velocity and pressure drop across the mist eliminator. Eventually, the induced-draft (ID) fan becomes unable to move flue gas through at the desired rate, requiring FGD modules to be shutdown for cleaning.

Most FGD wet scrubbing processes add limestone ($CaCO_3$) or lime (CaO) to make up a reagent solution slurry. These reagents react with the $SO_2$ in the flue gas to produce a solids slurry containing calcium sulfite hemihydrate and calcium sulfate respectively, the latter being present as gypsum. Sulfur oxides are precipitated out of the reagent solution and removed from the system via a bleed line to eventual dewatering and landfill or sale as a raw material.

Scaling caused by calcium suflite hemihydrate and gypsum deposition has been observed in or on the absorber, mist eliminators, dewatering thickeners, transfer and circulation lines, valves, and pump parts of FGD units. Calcium sulfite scale is typically soft and generally may be removed by either reducing slurry operating pH or hydroblasting the unit with water. Gypsum scale is much harder and is very difficult to remove.

Gypsum scale is more prominent in FGD systems that employ limestone rather than lime. Limestone has a lower solubility than lime and a larger amount of excess limestone reagent is required for sulfur dioxide removal. The use of excess limestone slurry causes a high carryover from the absorber to the mist eliminator. The solid phase of the slurry droplets tends to be deposited; whereas; the liquid portion gathers into a large droplet and falls back into the slurry reaction tank. Since a vast number of FGD wet scrubbers currently in operation utilize limestone reagent, widespread gypsum scaling problems exist. To control gypsum scaling, various gypsum scale inhibitors are added to the FGD mist eliminator wash water.

Due to water balance limitations, it is common to employ cooling water system blowdown as a makeup stream for FGD wet scrubber wash water. In doing so, however, an operator would have to employ two different chemical inhibitor treatment programs. The first controls cooling water system deposits and corrosion, and the second controls FGD wet scrubber gypsum scaling. Accordingly, it is necessary to employ and maintain separate feed lines for different inhibitors, one specific to cooling water and the other specific to FGD mist eliminators.

Dual treatment programs are more expensive because they require additional maintenance, pumps, piping, chemical inventory, and the like. A single treatment program which inhibits deposition and corrosion in cooling water and gypsum scaling in FGD systems would decrease expenses, increase system efficiency and be accordingly welcomed by those skilled in the art.

It is therefore an object of the present invention to provide a combined process for inhibiting water system scaling and corrosion in cooling water systems and gypsum scaling in FGD systems.

It is further an object of the present invention to provide an inhibitor formulation which inhibits corrosion and calcium phosphate, calcium carbonate, and silt deposition in cooling systems, and gypsum scaling in FGD systems. Other objectives which are apparent from the specification are also contemplated.

SUMMARY OF THE INVENTION

In one embodiment, the present invention comprises a combined cooling water/flue gas desulfurization process. The process comprises contacting a gas with a liquid medium in a cooling tower. The gas has a lower temperature and a lower thermal energy value than that of the liquid medium such that upon contact the liquid is cooled by the transfer of thermal energy from the liquid to the gas medium. The liquid medium comprises an effective amount of inhibitor sufficient to inhibit deposition and corrosion in the cooling system's heat exchangers. A portion of the liquid medium is drawn off and supplied as makeup to at least a portion of reagent makeup and mist eliminator wash water employed in the flue gas desulfurization system. In the flue gas desulfurization absorber, the reagent slurry is contacted with a sulfur-containing gas at desulfurization conditions thereby desulfurizing the sulfur-containing gas. The inhibitor containing water from the cooling tower is supplied to the flue gas desulfurizer in an amount such that the water comprises an effective amount of inhibitor sufficient to prevent gypsum scale formation in the flue gas desulfurizer at desulfurization conditions.

In accordance with an additional embodiment of the present invention the liquid medium from the cooling tower is fed to the mist eliminator wash system of the flue gas desulfurizer thereby inhibiting the formation of gypsum scale on mist eliminators contained therein.

In yet another embodiment of the present invention the liquid medium from the cooling tower is fed to the sulfur dioxide absorber area of the flue gas desulfurizer thereby inhibiting the formation of gypsum scale therein.

In accordance with a still further embodiment, the present invention provides an inhibitor formulation which inhibits corrosion and deposition of silt calcium phosphate, and calcium carbonate in cooling water systems as well as gypsum scaling in FGD systems. The formulation comprises a mixture of polyacrylate, polymaleic anhydride, and phosphonate in an active weight ratio range of about 1 to 40:1 to 40:0.1 to 15, respectively.

DESCRIPTION OF PRESENTLY PREFERRED EMBODIMENTS

Figure 1:
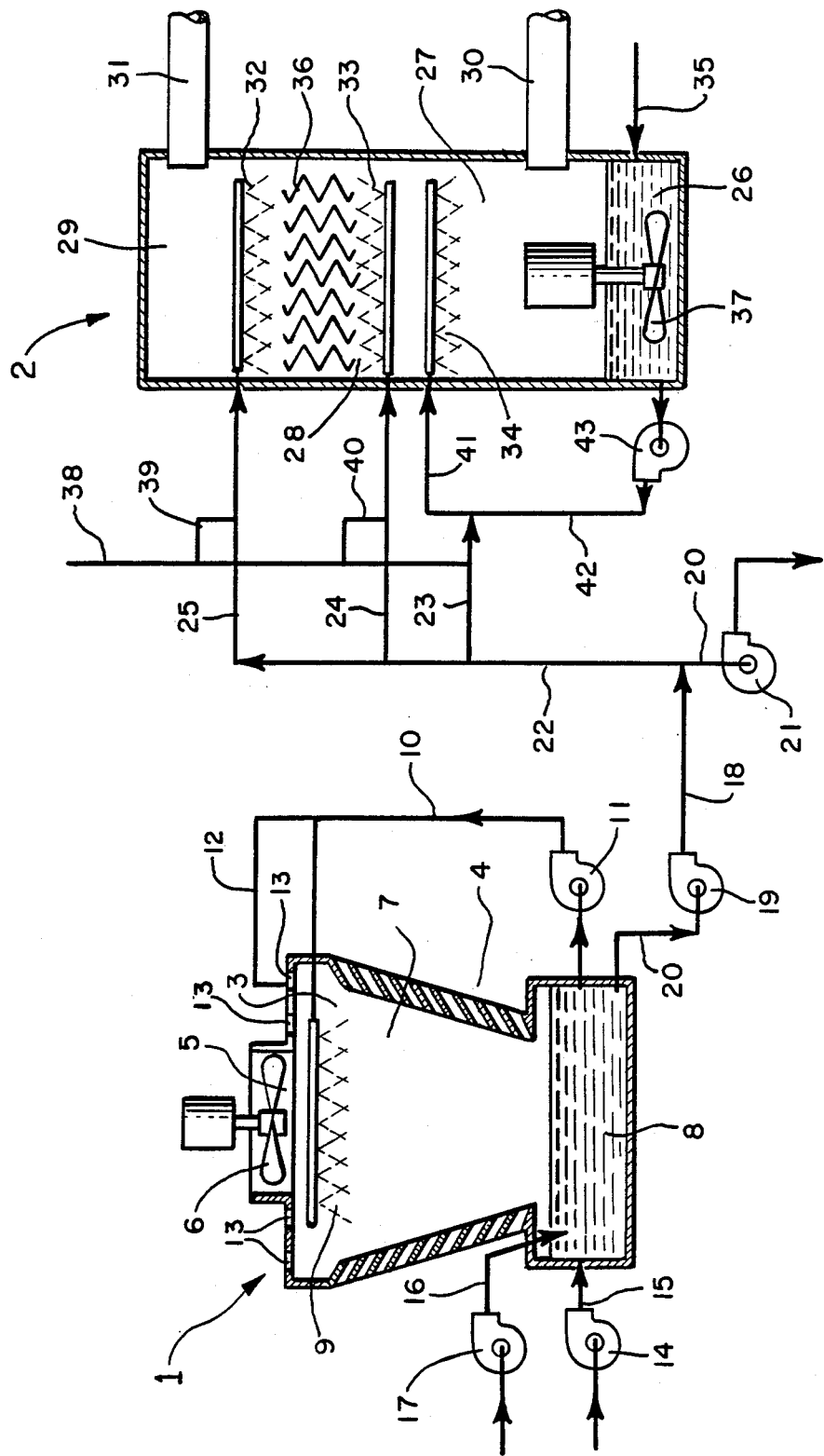
FIG. 1 is a schematic illustration of a preferred embodiment of the process of the present invention.

In accordance with the present invention, an inhibitor formulation and its use in a combined process for inhibiting deposition and corrosion in cooling water and gypsum scaling in FGD scrubber systems has now been discovered.

The present invention provides various process advantages including an increase in maintenance efficiency from only maintaining an single treatment system and a reduction in the number of feed points to both the cooling water and FGD systems. Also, efficiencies result from a reduction in the amount of energy spent in transporting and inventoring individual treatment chemicals. In addition, greater flexibility in managing the water balance of the cooling/FGD operation is experienced. Those skilled in the art will readily recognize additional advantages resulting from the inhibitor formulation and combined treatment process of the present invention resulting in substantial commercial success.

The inhibitor formulation of the present invention includes the combination of polyacrylates, polymaleic anhydrides and hexamethylene diamine tetra (methylene phosphonic acid) salts ("phosphonates"). Preferably the polyacrylates and polymaleic anhydrides have low molecular weights in the range of about 1,000 to about 10,000. Specific polyacrylates contemplated by the present invention comprise commercially available compounds known as Goodrite K-752 (63% active), Acrysol LMW-10X, 20X and 45X. Preferred polymaleic anhydrides include commercially available compounds known as Belclene 200 and 283 (50% active) while preferred phosphonates includes those commercially available in the Dequest 2000 Series of which Dequest 2054 (25% active) is most preferable.

Phosphonates and low molecular weight polyacrylates, are known to inhibit the precipitation of well defined seeded gypsum crystals. However, the prior art has taught that good gypsum scale inhibitors do not necessarily provide good calcium phosphate or calcium carbonate scale inhibition, and vice versa. Phosphate and carbonate scale forms at the typical cooling water system pH of about 6 to about 8 which is higher than the typical operating pH of about 4.5 to about 6.5 of an FGD scrubber slurry where gypsum formation is common.

Preferably, the inhibitor formulation of the present invention comprises polyacrylate, polymaleic anhydride and phosphonate in an active weight ratio range of about 1 to 40:1 to 40:0.1 to 15, respectively. Most preferably the inhibitor formulation comprises a respective weight ratio of about 6:7:1. The inhibitor formulation may be added to the cooling liquid medium in an amount sufficient to maintain between about 3 ppm to about 1400 ppm by weight of formulation in the liquid medium which corresponds to about 0.2 ppm to about 100 ppm by weight of active inhibitor.

Polyacrylates are known to have the following general formula:

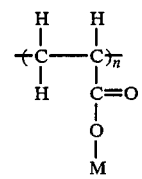

Where n is an integer sufficiently large in number so as to achieve a weight average molecular weight between about 1,000 and about 50,000, and M is H, an alkali metal, an alkaline earth metal, a transition metal, NH$_4$, a C$_1$-C$_4$ alkyl and the like, or a mixture thereof.

Polymaleic anhydrides are known to have the following general formula:

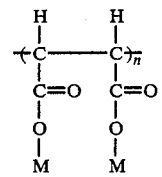

Where n is an integer sufficiently large in number so as to achieve a weight average molecular weight between about 1,000 and about 50,000, and M is H, on alkali metal, an alkaline earth metal, a transition metal, NH$_{41}$ a C$_1$-C$_4$ alkyl, and the like or mixture thereof.

A commonly known phoshonate, Dequest 2054, is a potassium salt of hexamethylene diamine tetra (methylene phosphonic acid) having the following formula:

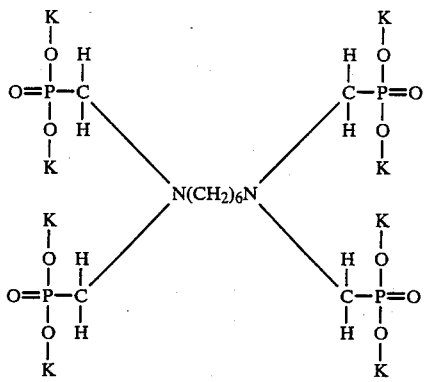

The polyacrylate, polymaleic anhydride, and phosphonate components of the inhibitor formulation of the present invention may be combined by any manner known to those skilled in the art. Accordingly, the polymers may be individually dissolved in an aqueous solution and thereafter mixed, or may be so dissolved in a single aqueous solution.

In addition to the inhibitor formulation of the present invention, it is to be understood that other, cooling system corrosion compounds may also be added and maintained in the aqueous system. Accordingly, copper corrosion inhibitors such as tolytriazole and cathodic protectors such as zinc chloride which protects mild steel and copper from corrosion may be added. These copper corrosion inhibitors may be mixed with the inhibitor formulation components if compatible or may be added separately. Preferably, tolytriazole is mixed with or added along with the inhibitor formulation as it is compatible, but zinc chloride being incompatible with the formulation is preferably fed separately.

In addition, phosphate corrosion inhibitors may also be added as part of the inhibitive formulation. Phosphate corrosion inhibitors contemplated include orthophosphate and hydroxyethylidene-1,1-diphosphonic acid (HEDP).

The inhibitor formulation and any compatible corrosion inhibitors may be added to the cooling tower aqueous system by first dissolving in an aqueous solution. Generally the aqueous solution is adjusted to a pH range of about 9 to about 10 to minimize corrosion of the chemical formulation on feed equipment. The pH of the solution may be increased by adding a suitable pH adjuster such as sodium hydroxide solution.

It is to be understood that some loss of the inhibitor formulation may be experienced when the inhibitor containing water is fed to the FGD unit as wash water. In addition, inhibitor concentration is diluted when cooling water blowdown is only a part of the total wash water. Accordingly, the water is fed to the FGD unit in an amount sufficient to maintain between about 0.15 ppm to about 280 ppm active by weight of formulation in the FGD wash water, which is equivalent to about 0.01 ppm to 20 ppm by weight of active inhibitor.

FIG. 1 schematically illustrates a preferred embodiment of the process of the present invention. FIG. 1 depicts cooling system 1 and FGD wet scrubber 2. Cooling system 1 comprises a cooling tower 3 the construction of which is generally known to those skilled in the art. Cooling tower 3 comprises cooling area 7 and water-holding basin 8. The air used for cooling enters cooling tower 3 through inlet area 4 and travels upwardly through cooling area 7 exiting through outlet 5. Means for assisting the upwardly flow of air such as induction fan 6 may be employed as illustrated.

As the air flows upwardly through cooling area 7 water distributed by tower top apertures 13 or spray nozzles 9 flows downwardly through the cooling area contacting the cooler air and since the air has a lower temperature than the water, heat is exchanged from the water. Once it has passed downwardly through cooling area 7 the water is collected and held in water-holding basin 8.

Water is supplied to tower top apertures 13 or spray nozzles 9 from recyclre lines 10 and 12 with the assistance of pump 11. Makeup water may also be supplied to recycle line 10 or more commonly to water-holding basin 8 through lines 15 via pump 14. It is to be understood that the exact location of makeup water and the amount required will vary widely with operation, and the present invention is not limited thereby. In addition, various heat exchangers (not shown) are employed in recycle line 10.

Cooling system 1 may also comprise various other means and appurtenances for enhancing the heat exchange which takes place therein. This includes for example, various packing materials contained within cooling area 7 which are intended to enhance the contact and heat exchange between water and air. In addition, spray nozzles 9, tower top apertures 13, or any other water distribution means may be employed at various levels and in various patterns according to teachings known to those skilled in the art. Also, the cooling air may enter into the cooling area through appropriate distribution apparatus. Finally, additional recycle lines may also be provided.

In accordance with the preferred embodiment of the present invention the inhibitor formulation is fed to the water system by way of line 16 and pump 17. The inhibitor formulation is preferably fed to the water contained in water-holding basin 8 and mixed therein. Preferably the inhibitor formulation is previously dissolved in an aqueous solution, but may also be added as a powder or solid.

Cooling system 1 also contains one or more blowdown systems such as blowdown line 18 and pump 19. The blowdown may be drawn off from the system such as by pump 21 and line 20. According to the present invention at least a portion of blowdown from the cooling system is channeled to FGD wet scrubber 2. Accordingly, blowdown water may enter FGD wet scrubber 2 by way of line 22 and either one or more combinations of lines 23, 24 and 25. The blowdown water is supplied to the flue gas desulfurizer in an amount such that between about 0.01 to about 20 ppm active by weight inhibitor formulation is maintained in the reagent wash water.

FGD wet scrubber 2 comprises reaction tank 26, absorber area 27, mist eliminators 36, and air plenum 29. Flue gas comprising sulfur containing contaminants enters through flue gas inlet 30 and travels upwardly through absorber area 27, mist eliminator are a 28, air plenum 29, and exits through clean flue gas outlet 31. The flue gas is cleaned by contacting wash water which is supplied through upper mist eliminator spray nozzles 32, lower mist eliminator spray nozzles 33, and absorber spray nozzles 34 or any combination thereof. The wash water contacts dirty flue gas fed to the system by way of line 30 and removes sulfur dioxide and like contaminants. The dirty wash water falls into reaction tank 26 wherein sulfur contained therein reacts with lime or limestone slurry fed through line 35. The reaction tank may also contain mixer 37 to provide homogeneity.

Wash water is supplied to mist eliminator spray nozzles 32 and 33 or similar means through blowdown lines 24 and 25. Make up water may also be supplied through lines 38, 39 and/or 40.

It is to be understood that the exact amount of makeup water and blowdown water will vary according to various operation conditions. However, the blowdown water channelled to the mist eliminator contains an effective amount of inhibitors sufficient to inhibit the formation of gypsum scale in mist eliminator area 28 and specifically on mist eliminators 36 and/or spray nozzles 32 and 33.

In accordance with another embodiment of the present invention, blowdown water may be fed to absorber area 27 by way of line 23 and 41 to absorber spray nozzles 34. The absorber area wash water may also be supplied by makeup water 38 and recycle water 42 drawn from reaction tank 26 by pump 43. While it is preferred that blowdown water containing the gypsum scale inhibitors initially added to the cooling system 1 through line 16 be fed to mist eliminator area 28, it is to be understood that at least a portion of the blowdown water may also be fed to absorber area 27.

EXAMPLES

Example 1-Cooling Tower Water Application

All cooling water inhibitor formulation testing was performed with a Pilot Cooling Tower (PCT). The PCT system employed assisted monitors for pH, conductivity, fouling factor using thermocouple heaters, and corrosion rates using corrators. Briefly, the PCT comprised a tower having an open bottom end and a thermostatically controlled fan at the top end. A basin at the bottom of the tower collected makeup and cooled water. Water from the basin was pumped through pH and conductivity cells and then through a series of tube heaters. Upon exiting the heaters, the water was fed past a corrator probe, metal coupons and then to the top of the tower for cooling. Inhibitor formulation was fed to the water basin with infusion chemical feed pumps.

During testing, the towers were chlorinated three times a week using sodium hypochlorite in order to attain a 0.2 ppm chloride residual. Metal ions in the water were analyzed by atomic absorption while silica, phosphates, and tolyltriazole were measured by wet chemical methods.

An inhibitor formulation containing Goodrite K-752, Belclene 283, and Dequest 2054 in a weight ratio of 5:7:2 respectively was prepared and added at a dosage of 100 ppm to the PCT. In addition, a standard dosage of tolyltriazole (1 ppm) and zinc (1 ppm soluble) for corrosion protection was also added. The formulation was added to a synthetic river water of pH 7.6, that when cycled up contained 1800-1900 ppm calcium as $CaCo_3$ and 1800-2000 ppm magnesium as $CaCO_3$.

The tower was begun at one cycle, pH 7.4 with theoretical dosages of tolyltriazole and zinc at 1 ppm. Once the tower reached cycle, a mild steel tube was inserted. At this point, the synthetic makeup water was changed to actual cooling tower blowdown containing 1400-1500 ppm calcium as $CaCO_3$ and 1400-1500 ppm magnesium as $CaCO_3$.

The corrosion rate of the mild steel tube was 8.45 mpy, while the corrosion rate of three copper/nickel (90/10) tubes was 0.095, 0.1, and 0.195 mpy.

The inhibitor formulation of the present invention performed substantially better than a prior art formulation containing 65-67 ppm of a 2-acrylamide-2-methylpropane sulfonic acid (AMPS)-based polymer, 2 ppm tolytriazole, and 1 ppm soluble zinc. The prior art inhibitor formulation gave a mild steel corrosion rate of 7.9 mpy and three copper/nickel (90/10) tube corrosion rate of 0.35, 0.42 and 0.38 mpy.

While the results revealed that the prior art formulation seems to control mild steel corrosion better, subsequent tests revealed that maintaining zinc levels was the most critical factor in controlling this type of corrosion. To control mild steel corrosion, it is preferred to maintain at least 2 ppm soluble zinc at a pH of about 8.0. At a pH of 8.0 and 3 ppm of soluble zinc, mild steel corrosion rates as low as 6 mpy were measured by the corrator. In addition, orthophosphate was also added to the system and seemed to help provide a weak anodic protection to complement the corrosion protection provided by the zinc.

Example 2-FGD Application

Cooling water blowdown containing the inhibitor formulation of the present invention were evaluated for calcium sulfate inhibition effectiveness. The evaluation method employed was a modified calcium sulfate NACE Standard TM-03-74 test procedure. The NACE procedure is recommended by the Technical Practices Committee for the testing of calcium carbonate and calcium sulfate precipitation. The details of the NACE procedure may be found in "Laboratory Screening Tests to Determining The Ability of Scale Inhibitors to Prevent the Precipitation of Calcium Sulfate and Calcium Carbonate from Solution", NACE Standard TM-03-74, by the Technical Practices Committee, 1974.

The testing conditions were modified to simulate gypsum concentrations, pH and temperature conditions present in an FGD process. A typical procedure involved the preparation of calcium and sulfate brine solutions followed by an adjustment of pH. Various concentrations of the brine solutions were prepared to provide an adequate gypsum concentration range.

Brine solutions 3X were prepared such that equal molars of calcium and sulfate were added to all test samples. The 3X brines contributed 11,325 ppm each of sulfate and calcium as calcium carbonate. During testing various equal volumes of calcium and sulfate brines were added to increasing volumes of blowdown such that the total volume in the test bottle was equal to 100 ml. This provided supersaturated gypsum solutions of various degrees.

After complete mixture the bottle was placed in a 140° F. water bath for three days. The water bath was preferred over an oven because of a more uniform temperature distribution. After three days at 140° F., the bottle was taken from the water bath and the supernatant was immediately analyzed for soluble calcium. Care was taken not to disturb the bottle during this time in order to minimize dispersion of the solids within the solution.

The supernatant solution was immediately diluted and then titrated by the well-known EDTA wet method of soluble calcium. The percent inhibition was then calculated by first subtracting the presence of soluble calcium in a blank from the sample and then dividing by the initial solubility of calcium in the sample after subtraction of calcium initially present in the blank. Accordingly, the results represent the inhibiting activity of an inhibitor relative to a blank sample.

Cooling water blowdown from the cooling tower described in Example 1 was used to assess gypsum inhibition performance. Six samples were prepared as shown in Table I. At the higher gypsum saturation ratios, inhibition was low. Effective gypsum inhibition, however, was obtained over a wide gypsum saturation range in scaling conditions equivalent to or more severe than the cooling water blowdown.

TABLE I

GYPSUM INHIBITION TESTS USING INHIBITION ADDITIVE FROM COOLING WATER BLOWDOWN

| Sample | A | B | C | D | E | F |
|---|---|---|---|---|---|---|
| Tower Blowdown, ml | 50 | 60 | 70 | 80 | 90 | 100 |
| Brines | | | | | | |
| Ca, ml | 25 | 20 | 15 | 10 | 5 | 0 |
| SO$_4$, ml | 25 | 20 | 15 | 10 | 5 | 0 |
| Total | 100 | 100 | 100 | 100 | 100 | 100 |
| Total Ca Added* | 6613 | 5670 | 4727 | 3785 | 2842 | 1900 |
| Inhibitor Present ppm | 3.27 | 3.93 | 4.58 | 5.24 | 5.89 | 6.55 |
| Total Ca* Inhibited ppm | 2400 | 2600 | 4500 | 3600 | 2900 | 2000 |
| Gypsum Inhibition % | 36.3 | 45.9 | 95.2$^a$ | 95.1$^a$ | 102.0$^a$ | 105.3$^a$ |

*as CaCO$_3$
**measured as soluble calcium in solution
$^a$excellent inhibition results

We claim:

1. A combined cooling water/flue gas desulfurization process comprising:

(a) contacting a gas with water in a cooling tower said gas having a lower temperature than said water such that upon contact said water is cooled by the transfer of thermal energy from said water to said gas, said water comprising between about 0.2 and about 100 ppm active by weight of an inhibitor formulation comprising polyacrylate, polymaleic anhydride, and phosphonate;

(b) contacting a sulfur-containing gas with reagent slurry in a flue gas desulfurizer thereby desulfurizing said sulfur containing gas; and (c) supplying at least a portion of said water from said cooling tower to make up at least a portion of wash water in said desulfurizer, said water being supplied in an amount sufficient to maintain between about 0.01 and about 20 ppm active by weight of said inhibitor formulation in said reagent wash water.

2. The process of claim 1 wherein said inhibitor formulation comprises polyacrylate, polymaleic anhydride, and phosphonate in a weight ratio range of between about 1 to 40:1 to 40:0.1 to 15, respectively.

3. The process of claim 1 wherein said inhibitor formulation comprises polyacrylate, polymaleic anhydride, and phosphonate in an active weight ratio range of about 6:7:1.

4. The process of claim 1 wherein said inhibitor formulation comprises tolytriazole.

5. The process of claim 1 further comprising maintaining between about 0.2 to about 10 ppm by weight tolytriazole in said cooling tower water.

6. The process of claim 1 further comprising maintaining between about 0.2 to about 10 ppm by weight soluble zinc in said cooling tower water.

7. The process of claim 1 wherein said inhibitor formulation is added to the cooling tower water in an aqueous solution.

8. The process of claim 1 wherein said flue gas desulfurizer comprises mist eliminators and said wash water is supplied to a mist eliminator wash water system.

* * * * *